UNITED STATES PATENT OFFICE.

ROBERT A. CHESEBROUGH, OF NEW YORK, N. Y.

IMPROVED PROCESS FOR PURIFYING COAL-OIL, &c.

Specification forming part of Letters Patent No. 49,502, dated August 22, 1865.

*To all whom it may concern:*

Be it known that I, ROBERT A. CHESEBROUGH, of 124 Maiden lane, city of New York and State of New York, have invented a new and useful Method of Purifying Coal-Oil and Petroleum by Filtration; and I do hereby declare that the following is a full and exact description thereof.

The nature of my invention consists in the use of bone-black for purifying petroleum or coal oils by filtration by first distilling the crude coal-oil or petroleum in a still with a condensing-worm, such as is commonly used for distilling the same.

The products of distillation are benzole, illuminating-oil, and heavy oil, which I then filter, either separately or combined, as follows: The material I use for filtering through is boneblack made of charred bones. The filter is made of wood or iron, of any suitable form and height. The filter is filled up with the boneblack as high as may be necessary, according to the quality of the oil. The oil is run in on top of the filtering material and allowed to filter through the perforated bottom of the filter, where it is collected. The operation is continued by feeding the oil into the top of the filter as fast as it runs through the filtering material until the filtered oil shall begin to assume a dark color, when the operation is suspended and the filter replenished by fresh material.

The coal oil or petroleum refined by this process will be sweet in odor, of a light color, and will need no other treatment.

The crude petroleum from the wells may be purified by this process without any previous distillation, either for purposes of illumination or lubrication.

What I claim as my invention, and desire to secure by Letters Patent, is—

The use of bone-black for purifying petroleum or coal oils by filtration.

ROBT. A. CHESEBROUGH.

Witnesses:
J. FRANKLIN REIGART,
EDM. F. BROWN.